July 22, 1952     E. W. SMITH     2,604,503
TORSIONALLY OSCILLATING ROTATING ROLL
Filed Feb. 28, 1951     2 SHEETS—SHEET 1

INVENTOR.
Edward W. Smith
BY Ezekiel Wolf
his Attorney

July 22, 1952 — E. W. SMITH — 2,604,503
TORSIONALLY OSCILLATING ROTATING ROLL
Filed Feb. 28, 1951 — 2 SHEETS—SHEET 2

INVENTOR.
Edward W. Smith
BY Ezekiel Wolf
his Attorney

Patented July 22, 1952

2,604,503

UNITED STATES PATENT OFFICE 2,604,503

TORSIONALLY OSCILLATING ROTATING ROLL

Edward W. Smith, Melrose Highlands, Mass., assignor to L. S. Adams Engineering, Inc., Boston, Mass., a corporation of Massachusetts Application February 28, 1951, Serial No. 213,156

8 Claims. (Cl. 172—126)

This invention relates to a means and method of oscillating rolls and more particularly to rolls capable of oscillating about their axes while being rotated simultaneously in a given direction.

In many industrial operations as for instance in the continuous production of felt it is desirable to have a roll which can be oscillated about its axis at the same time as it is rotating and over which the material to be treated may be passed.

The present invention is directed particularly to a simple and effective method and means for providing torsional oscillation of a roll simultaneously with its rotation. It also provides a method and means for accomplishing the torsional oscillation of the roll at high speeds, i. e., 7200 vibrations per minute if necessary or desirable while the roll may be simultaneously rotated continuously at any desired speed.

Another object of the invention is to provide a means whereby the mechanism bringing about the rotation of the roll will only be subjected to a very small amount or even none of the torsional oscillation of the roll itself.

Another object of the invention is to provide a means whereby very substantial driving torques may be obtained in a compact space.

Still another object of the invention is to provide a simple and practicable means whereby the speed of vibration may be changed easily, or rolls of differing lengths or diameters may be employed without changes in the driving mechanism.

A further object of the present invention is to produce torsional oscillation wherein the shaft to which the torsional stresses are applied may be operated under a balanced resonant condition whereby the vibrations will be confined efficiently to the elements it is desired to vibrate and not be imparted to the power source and adjacent structures which may simply be acting as supporting elements.

The means by which the above objectives, as well as others are attained will become clear from an examination of the drawings illustrating an embodiment of the same in which:

Figure 3 shows a fragmentary side elevation of one complete electro-magnet and armature structure with supporting elements.

Figure 1:
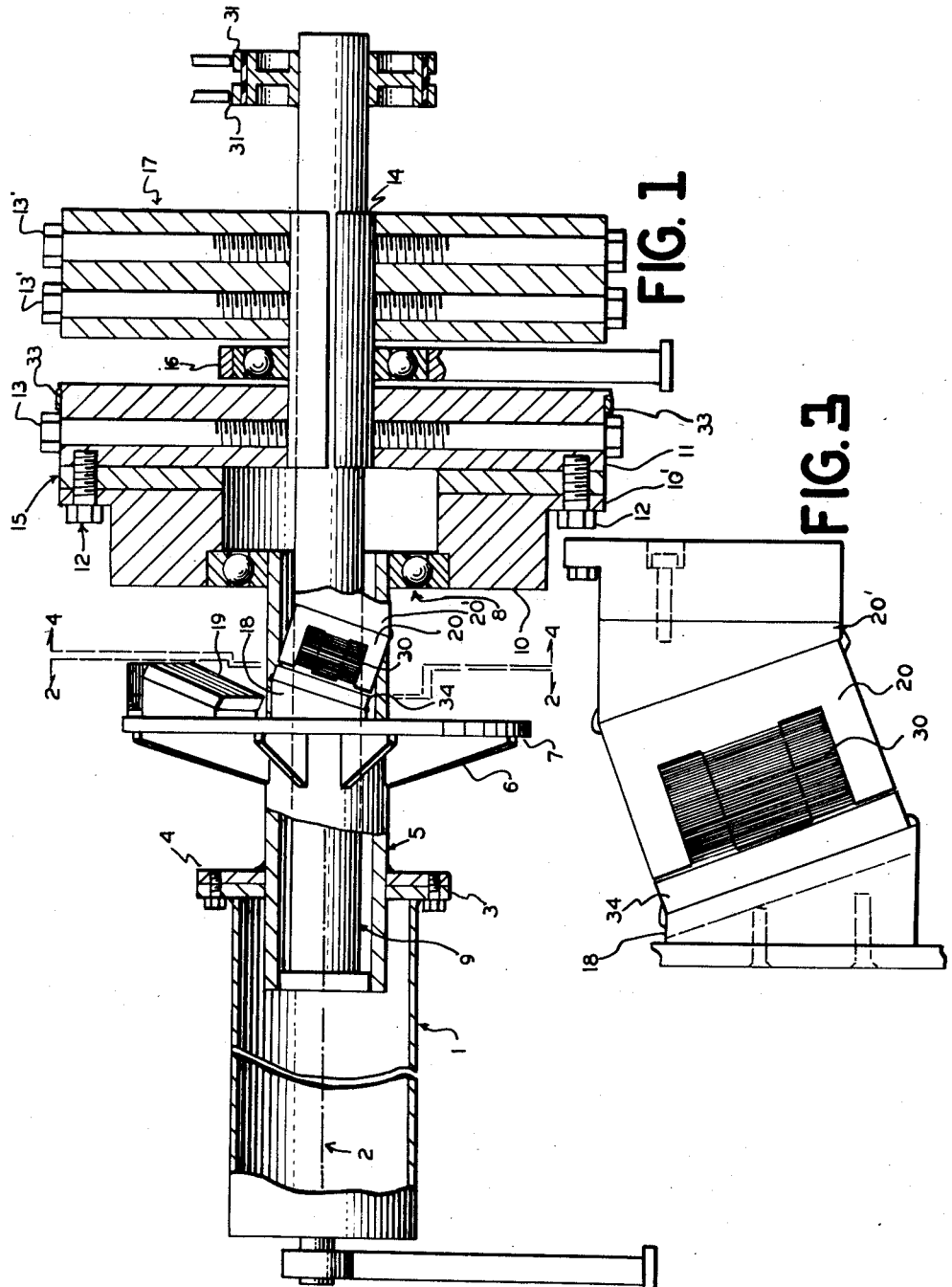
Figure 1 shows a fragmentary cross section of the invention.
Figure 2:
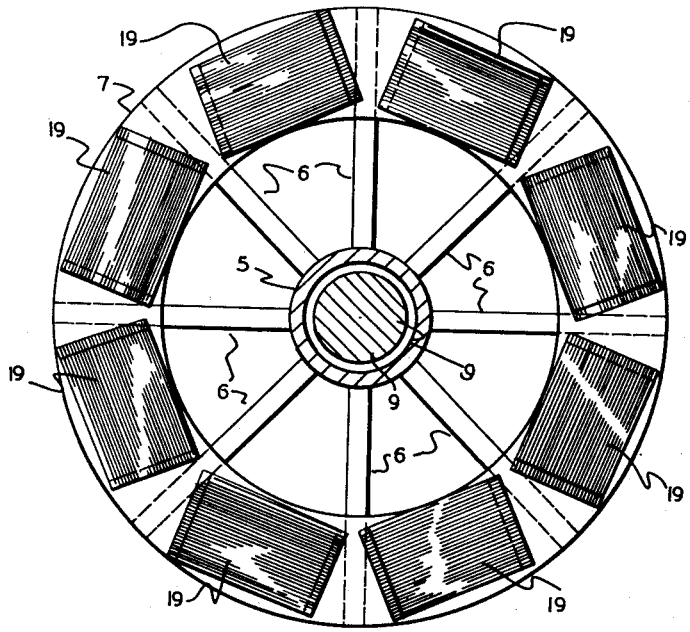
Figure 2 shows a sectional view substantially on the line 2—2 of Figure 1 omitting the electromagnets but showing the armatures of the vibratory structure.
Figure 4:
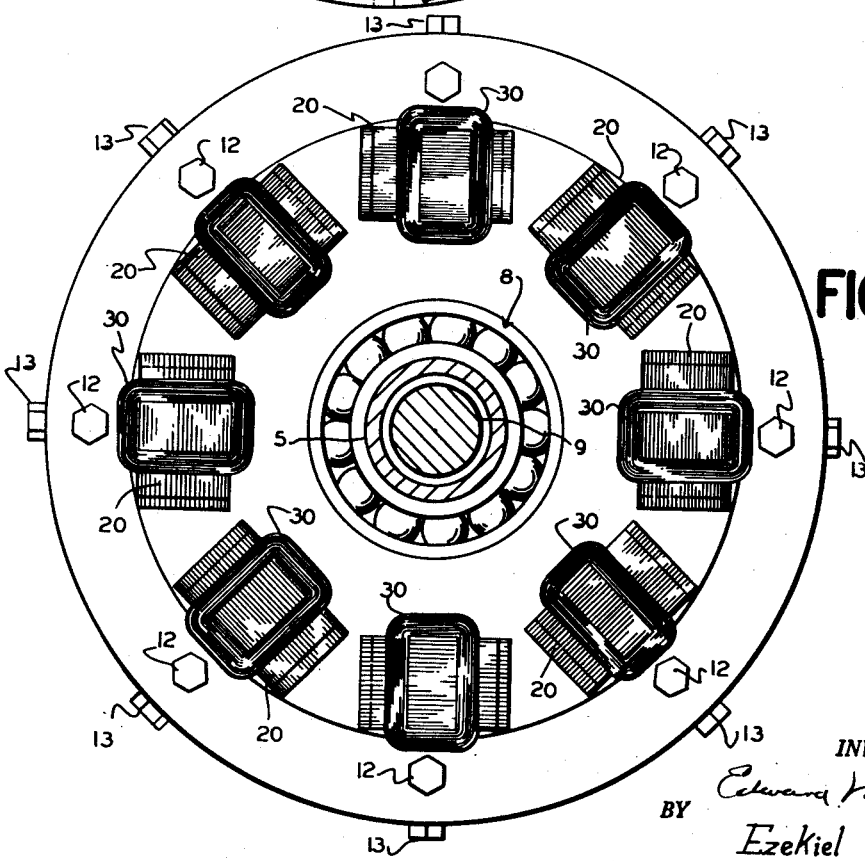
Figure 4 shows a sectional view substantially on the line 4—4 of Figure 1 omitting the armatures but showing the electromagnets of the vibratory structure.

In Figure 1, I denotes the roll to be vibrated torsionally about its axis 2. Roll I is provided with a flange 3 to which it is securely welded and flange 3 is, in turn, bolted to a second flange 4 welded or otherwise adequately secured to tube 5. Tube 5 is thus held concentric with the roll I.

It will be noted that tube 5 has secured to it a series of ribs 6 extending radially outward from tube 5 and serving to support solidly the armature base ring 7, the axis of which likewise is concentric with the axis of roll I. Tube 5 extends beyond the armature base ring 7 and is supported at its end by bearing 8 in which it is free to turn.

An examination of Figure 1 will also indicate that a torsion shaft 9 is solidly secured by welding, or otherwise to the end of the tube 5 which is bolted to the end of roll I and is concentric with tube 5. It will be noted that the outer race of bearing 8 is secured in a recess in the field element support 10, which is a heavy circular plate with an outwardly extending flange 10' through which in turn the plate is secured to a circular inertia element II by bolts 12. Spaced bolts 13 pass from the outer rim radially through inertia element II and press on the split ring collar 14, which in turn presses upon shaft 9 securely locking element 14, and consequently secures the field support element 10 to shaft 9 at a point along its length which may be varied by changing the thickness of spacing ring 15.

Split ring collar 14 extends beyond inertia element II to provide space for a supporting bearing 16 and another inertia element 17 is similarly secured to shaft 9 by radial bolts 13', 13' passing through it and pressing collar 14 tightly against shaft 9. Referring again to Figure 1, angle blocks 18 are spaced around the armature support ring 7 and have armature lamination blocks 19 welded to them. Corresponding E-shaped field lamination blocks 20 are similarly welded to similar angle blocks 20' secured in turn to the field element support 10.

These elements, the angle blocks 18 and 20' and the armature 18 and field block 20, are arranged circumferential on the ring 7 and the field element support 10, with the surface of the laminations 19 opposed to the surface of the E-shaped field laminations. The angle blocks are such as to provide an angle of approximately 20° and the air gap may be very small in the range of thousandths of an inch. In a construction which I have successfully used, the air gap was .045" for a 20° angle and a $\frac{1}{16}$" amplitude on a 6" diameter roll. The angle and gap would differ for other angular amplitudes.

It may be exlained at this point that the above described system constitutes a torsionally resonant mechanical system having a single degree of freedom. Thus, in effect, an inertia system consisting of the roll 1, its flange 3, tube 5, its flange 4 and asociated ribs 6, armature support ring 7 and the armature lamination blocks 19, is secured at one end of a torsional stiffness system represented by shaft 9, the other end of the torsional stiffness system being secured to an inertia system which is large, i. e., 10 times or more, the inertia of the driven element assembly.

If, now, electrical windings 30 are placed in the spaces provided for them around the middle leg of the E-shaped field lamination blocks 20 and energized by alternating current, a corresponding series of force pulsations will be set up between the armature and field elements 19 and 20 and perpendicular to their adjacent faces. Since these faces are disposed at an angle with respect to a line normal to the axis of the shaft 9, a component of this force equal to the product of the force and the sine of the angle will be exerted at right angles to the shaft and provides a couple tending to twist the armature support ring and its associated tube 5 and roll 1, which in turn tends to twist the roll end of shaft 9 with respect to its other end.

The windings 30 in the field pieces are fed through slip rings 31, 31 mounted on the end of the shaft 9 at the right as shown in Figure 1. The drive for the system, that is for the rotation of the roll 1 may be around the inertia elements or on the right end of the shaft 9. It is desirable to put the drive at the node of the system since then the drive will have a minimum amplitude of vibration. In the showing of Figure 1, this is slightly to the left of the bearing 16. For this purpose, the inertia ring 11 may be made wide enough at the top beside the bolts 13 to support a driving belt 33 as shown in Figure 1.

If now the frequency of the alternating current used to energize the system is such that it is equal to one half the torsional resonant frequency of the system just described, the couple impulses mentioned above will be the same as the resonant frequency and roll 1 will oscillate torsionally about its axis.

The physical dimensions of the magnetic circuit as well as the angle at which the armature and field faces are disposed with respect to a perpendicular to the axis of the shaft, is a matter of design depending upon the size and inertia of the roll, the angle through which it is to be oscillated, and the amount of energy which it is intended to deliver to the material being treated.

That very substantial torques may be generated in this way in a confined space can best be illustrated by the following example. With a nominal maximum flux density of 60,000 lines/sq. inch across the gaps 34 it is easily possible to attain a pull perpendicular to the gap faces of 50 pounds/sq. inch. Thus with a pole surface area of 4 square inches a total maximum pull across the gap of 200 pounds can be obtained. Eight such armature and field combinations can be comfortably disposed around the periphery of and within a circle approximately 13¼ inches in diameter. Therefore a total of 1600 pounds of direct pull can be obtained. Using an angle of 20 degrees, the resultant force available to produce the twist would be 1600 times the sine of 20 degrees or 547 pounds. If these elements are so disposed that their resultant force is exerted at a distance of 5 inches from the axis of the shaft, as is conveniently possible, a maximum torque of 2740 inch pounds is available in a space approximately 13¼ inches in diameter by approximately 4 inches thick.

Mention has already been made of the fact that the above described arrangement is normally operated at its resonant frequency and that it is a single degree of freedom system. Consequently since this presupposes that the inertia of one end of the system, i. e. the inertia of the element at the opposite end of the stiffness element from the inertia to be oscillated, or in other words, the compensating inertia, is 10 times or more larger than the one to be moved, it naturally follows that its angular motion is proportionally reduced and, in effect, may be substantially zero even though it is clearly rigidly connected to the oscillating roll.

Therefore, the driving pulley may be mounted on the end of shaft 9 where it projects through compensating inertia 17. Rotation of the whole assembly can be effected without the driving belt being subjected to alternating tightening and loosening as would otherwise be the case.

As is the case in connection with the construction of the magnetic driving element, the details of length and diameter of the torsion shaft 9 are likewise a matter of design. In general, however, I prefer to make the dimensions of the shaft such that it will have the necessary torsional stiffness for the desired frequency and amplitude and that at this amplitude the maximum fiber stress in the shaft will not exceed 15,000 pounds/sq. inch. Changes in the frequency of the system or changes in the stiffness required for a given frequency where different rolls may be used with a given driving system, can be made by varying the thickness of the spacing ring 15, since this, in effect, changes the effective length of the torsion shaft.

As a concrete example of the design of such a system to meet the conditions outlined above, it is first necessary to determine the maximum accelerating torque required for the given angular amplitude of motion and frequency desired, for the roll and associated oscillating parts of the system. This may be determined from the relationship $T = Ja\omega^2$ where $J$ is the mass moment of inertia of the oscillating parts, $a$ is the amplitude in radians, and $\omega$ is $2\pi$ times the desired frequency in cycles per second.

Once this figure has been established the diameter of the torque shaft may be determined for the stipulated fiber stress by substituting the torque value thus obtained in the equation $$T = 15000 \, \pi \frac{d^3}{16}$$

where $d$ is the shaft diameter in inches.

Once the shaft diameter has been established its effective length in inches may be obtained from the equation $$L = \frac{[3400]^2 d^4}{W K^2 f}$$

where the factor "3400" is based on the assumption that the material from which the torsion shaft is made has a torsional modulus of elasticity of 12,000,000 pounds/sq. inch.

Having now described my invention, I claim:

1. A rotating drive having torsional vibrations comprising a drive shaft having a high modulus of elasticity, means effectively securely attached between two spaced sections of said drive shaft for producing an alternating torque between said spaced sections of the shaft comprising a plurality of electromagnets and armatures, the armatures secured in one said section of the shaft and the electromagnets at the other section of the shaft for applying said alternating torque.

2. A rotating drive having torsional vibrations comprising a drive shaft having a high modulus of elasticity, means effectively securely attached between two spaced sections of said drive shaft for producing an alternating torque between said spaced sections of the shaft comprising a plurality of armatures mounted circumferentially about said shaft and secured thereto in one section of the shaft, a plurality of electromagnets also mounted circumferentially about said shaft and secured thereto in a second section of the shaft spaced from the first section, said armatures and electromagnets being positioned in pairs opposing each other forming a magnetic air gap in between the faces of the armatures and the electromagnets, said air gap being inclined to the plane normal to the axis of rotation and means for energizing said electromagnets with alternating current.

3. A rotating drive having torsional vibrations comprising a drive shaft having a high modulus of elasticity, means comprising in part electromagnetic oscillating means attached and rigidly secured at one section of said shaft and providing in part a given mass, means forming a substantially larger mass including the other part of said electromagnetic means attached and rigidly secured at the other section of said shaft, and alternating current means for establishing oscillation between the portions of said electromagnetic oscillating means at a resonance frequency established by said masses and the modulus of elasticity of said shaft.

4. A rotating drive having torsional vibrations comprising a drive shaft having a high modulus of elasticity, means comprising in part electromagnetic oscillating means attached and rigidly secured at one section of said shaft and providing in part a given mass, means forming a substantially larger mass including the other part of said electromagnetic means attached and rigidly secured at the other section of said shaft, and alternating current means for establishing oscillation between the portions of said electromagnetic oscillating means at a resonance frequency established by said masses and the modulus of elasticity of said shaft and means for rotating said shaft.

5. A rotating drive having torsional vibrations comprising a drive shaft having a high modulus of elasticity, a sleeve joined at one end to said shaft, a flat ring member joined to and concentric with said sleeve, a plurality of armatures securely mounted on the face of said ring and arranged circumferentially about said shaft, an inertia mass secured to said shaft at a position spaced along said shaft from said sleeve, a plurality of electromagnets attached to said mass, one each mounted in opposing position to said armatures and providing an air gap, the plane of said air gap being inclined to the axis of rotation of the shaft, and means for energizing said electromagnets.

6. A rotating drive having torsional vibrations comprising a drive shaft having a high modulus of elasticity, a sleeve joined at one end to said shaft, a flat ring member joined to and concentric with said sleeve, a plurality of armatures securely mounted on the face of said ring and arranged circumferentially about said shaft, a second split sleeve mounted on said shaft and spaced from the first sleeve, a large mass having a bore in which said second split sleeve fits, a plurality of radial bolts in said large mass forcing said split sleeve tightly to said shaft, a plurality of electromagnets attached to said mass, one each mounted in opposing position to said armatures and providing an air gap, the plane of said air gap being inclined to the axis of rotation of the shaft, and means for energizing said electromagnets.

7. A rotating drive having torsional vibrations comprising a drive shaft having a high modulus of elasticity, a sleeve joined at one end to said shaft, a flat ring member joined to and concentric with said sleeve, a plurality of armatures securely mounted on the face of said ring and arranged circumferentially about said shaft, an inertia mass secured to said shaft at a position spaced along said shaft from said sleeve, a plurality of electromagnets attached to said mass, one each mounted in opposing position to said armatures and providing an air gap, the plane of said air gap being inclined to the axis of rotation of the shaft, means for energizing said electromagnets, and means for driving said shaft around the inertia mass.

8. A rotating drive having torsional vibrations comprising a drive shaft having a high modulus of elasticity, a sleeve joined at one end to said shaft, a flat ring member joined to and concentric with said sleeve, a plurality of armatures securely mounted on the face of said ring and arranged circumferentially about said shaft, an inertia mass secured to said shaft at a position spaced along said shaft from said sleeve, a plurality of electromagnets attached to said mass, one each mounted in opposing position to said armatures and providing an air gap, the plane of said air gap being inclined to the axis of rotation of the shaft, means for energizing said electromagnets, said shaft and masses forming a resonant elastic system with a torsion node near said inertia mass and means for driving said shaft in the vicinity of said node.

EDWARD W. SMITH.

No references cited.